United States Patent
Houdard et al.

(10) Patent No.: US 11,073,202 B2
(45) Date of Patent: Jul. 27, 2021

(54) ACTUATOR COMPRISING A BUILT-IN LUBRICATING SYSTEM

(71) Applicant: SAFRAN DATA SYSTEMS, Courtaboeuf (FR)

(72) Inventors: Hervé Houdard, La-Teste-de-Buch (FR); Thomas Mégard, La-Roche-Vineuse (FR)

(73) Assignee: SAFRAN DATA SYSTEMS, Courtaboeuf (FR)

( * ) Notice: Subject to any disclaimer, the term of this patent is extended or adjusted under 35 U.S.C. 154(b) by 0 days.

(21) Appl. No.: 17/046,557

(22) PCT Filed: Apr. 11, 2019

(86) PCT No.: PCT/EP2019/059315
§ 371 (c)(1),
(2) Date: Oct. 9, 2020

(87) PCT Pub. No.: WO2019/197559
PCT Pub. Date: Oct. 17, 2019

(65) Prior Publication Data
US 2021/0131552 A1 May 6, 2021

(30) Foreign Application Priority Data

Apr. 11, 2018 (FR) ...................................... 1853163

(51) Int. Cl.
*F16H 3/06* (2006.01)
*F16H 27/02* (2006.01)
(Continued)

(52) U.S. Cl.
CPC ......... *F16H 57/0497* (2013.01); *F16H 25/20* (2013.01); *F16H 57/0436* (2013.01);
(Continued)

(58) Field of Classification Search
CPC .. F16H 57/0497; F16H 25/20; F16H 57/0436; F16H 2025/2046; F16H 2025/2081
See application file for complete search history.

(56) References Cited

U.S. PATENT DOCUMENTS

| | | | |
|---|---|---|---|
| 6,691,837 B1* | 2/2004 | Kapaan | F16H 57/0497 188/72.1 |
| 2016/0160996 A1* | 6/2016 | Kohler | F16H 25/20 74/89.44 |
| 2017/0328463 A1* | 11/2017 | Kang | F16H 25/2204 |

FOREIGN PATENT DOCUMENTS

| | | |
|---|---|---|
| DE | 10235078 A1 | 3/2004 |
| FR | 656978 A | 5/1929 |

(Continued)

OTHER PUBLICATIONS

French Preliminary Search Report in French Application No. FR 1853163, dated Dec. 3, 2018.
(Continued)

*Primary Examiner* — Jake Cook
(74) *Attorney, Agent, or Firm* — Sughrue Mion, PLLC

(57) ABSTRACT

The invention relates to an actuator (1) comprising: a body (4), a first element (5) mounted such that it can move rotatably in relation to said body (4), and a second element (6) mounted such that it can move translatably in relation to said body (4), either the first element (5) or the second element (6) being a screw and the other one being a nut, the nut cooperating with the screw such that a rotation of the first element (5) in relation to the body (4) around an axis of rotation (X) causes the translation of the second element (6) in relation to the body (4) parallel to the axis of rotation (X), a cylinder which is stationary in relation to the first element (5), a piston mounted such that it can move translatably inside the cylinder between a first end position and a second end position, and a cam surface which is stationary in
(Continued)

Figure 1:
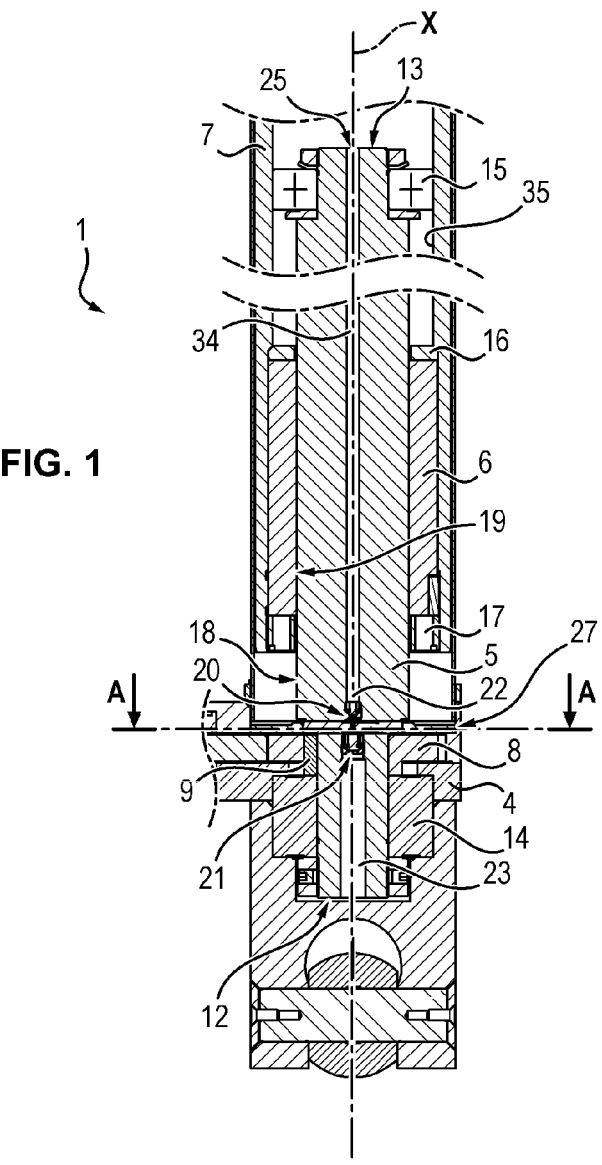

relation to the body (4) and against which the piston is supported such that a rotation of the first element (5) in relation to the body (4) causes a translatory back-and-forth movement of the piston between the first end position and the second end position.

13 Claims, 3 Drawing Sheets

(51) Int. Cl.
 *F16H 29/02* (2006.01)
 *F16H 29/20* (2006.01)
 *F16H 57/04* (2010.01)
 *F16H 25/20* (2006.01)
(52) U.S. Cl.
 CPC ................ *F16H 2025/2046* (2013.01); *F16H 2025/2081* (2013.01)

(56) References Cited

FOREIGN PATENT DOCUMENTS

| | | |
|---|---|---|
| JP | 6-159471 A | 6/1994 |
| JP | 2010-190307 A | 9/2010 |

OTHER PUBLICATIONS

International search report for PCT/EP2019/059315 dated Jul. 22, 2019.

\* cited by examiner

Position 0°

Position 90°

ACTUATOR COMPRISING A BUILT-IN LUBRICATING SYSTEM

CROSS-REFERENCE TO RELATED APPLICATIONS

This application is a National Stage of International Application No. PCT/EP2019/059315 filed Apr. 11, 2019, which claims priority under 35 U.S.C. § 119(a) to French Patent Application No. 1853163 filed Apr. 11, 2018, the entire contents of each of which are herein incorporated by reference in their entireties.

FIELD OF THE INVENTION

The invention relates to the field of screw-nut type actuators. The invention relates more particularly to an actuator, such as for example an actuator intended to be used for moving a communication antenna, including integrated lubricating.

PRIOR ART

Satellite communication antennas are generally supported by positioning devices which allow orienting the antenna to direct it toward the intended target. These positioning devices generally included several positioning actuators (or jacks) which are controlled to move the antenna toward the desired position.

The actuators (or jacks) used in devices of this type are generally actuators of the screw-nut type. An actuator of the screw-nut type comprises a screw and a nut, the nut being able to cooperate with the screw so that a rotation of the screw causes a translation of the nut relative to the screw.

In order to guarantee good accuracy in positioning the antenna, these actuators must both be very fast and have very little clearance. As a result, these actuators require to be lubricated during their operation.

To this end, a known solution consists of providing a reservoir of lubricating fluid mounted integrally with the nut. The lubricating fluid flows progressively from the reservoir and circulates from top to bottom inside the actuator by gravity. In certain applications, this circulation of lubricating fluid also participates in cooling the actuator. Once the lubricating fluid has reached the bottom of the actuator, this fluid is not recycled. It is therefore necessary to regularly recharge the reservoir with lubricating fluid. Moreover, an actuator of this type has a reduced working stroke.

Another known solution consists of providing an "oil sump" situated at the bottom of the actuator. The oil sump is a reservoir with a controlled volume containing lubricating fluid and into which the nut can be plunged. During the descent of the nut along the screw, the nut penetrates into the lubricating fluid volume. The pressure generated by this penetration causes a rise in the level of lubricating fluid in the nut. Lubricating is thus accomplished by fluid intake by the nut. However, in this case, the operation of the actuator must be regularly interrupted in order to place the nut in position for wetting with the lubricating fluid.

To mitigate these disadvantages, another solution consists of providing the actuator with a lubricating system comprising a pump located outside the actuator, the pump being connected to an injection circuit to cause the circulation of the lubricating fluid inside the actuator.

However, even if a single pump can be provided for supply several actuators in parallel, a system of this type remains complex, bulky and costly.

In addition, a system of this type necessarily includes hydraulic connections, which lead to risks of leakage, and consequently a considerable consumption of lubricating fluid.

SUMMARY OF THE INVENTION

One goal of the invention is to propose a solution for lubricating an actuator, which allows recycling of the lubricating fluid, while being less complex than a system including an external pump.

This goal is attained within the scope of the present invention by means of an actuator comprising:
- a body,
- a first element mounted movable in rotation relative to the body, and a second element mounted movable in translation relative to the body, one of the first element or of the second element being a screw and the other of the first element and of the second element being a nut, the nut being able to cooperate with the screw so that a rotation of the first element relative to the second element around an axis of rotation causes translation of the second element relative to the body parallel to the axis of rotation,
- a cylinder which is fixed in relation to the first element,
- a piston mounted movable in translation inside the cylinder between a first end position and a second end position,
- a cam surface fixed in relation to the body and against which the piston is supported so that rotation of the first element relative to the body causes a back-and-forth translation movement of the piston between the first end position and the second end position.

In an actuator of this type it is the rotation of the first element which causes the back-and-forth movement of the piston in the cylinder, which allows the circulation of the lubricating fluid inside the actuator. An actuator of this type does not require an external pump, or an injection or recovery circuit to connect the pump to the actuator.

This allows limiting the risks of leakage and reducing the consumption of lubricating fluid.

The volume of lubricating fluid can be limited.

Moreover, as the actuator incorporates an integrated lubricating system, it is not subject to the failure modes of systems external to the actuator.

In addition, a solution of this type has reduced bulk.

The actuator can further have the following features:
- the actuator comprises a suction line formed in the first element and able to supply the cylinder with lubricating fluid, and a suction valve able to allow circulation of the lubricating fluid in the suction line toward the cylinder when the piston is moved from the first end position to the second end position, and to prevent circulation of the lubricating fluid in the suction line when the piston is moved from the second end position to the first end position;
- the actuator comprises a discharge line formed in the first element and able to discharge the lubricating fluid from the cylinder, and a discharge valve able to allow circulation of the lubricating fluid in the discharge line from the cylinder when the piston is moved from the second end position to the first end position, and to prevent circulation of the lubricating fluid in the discharge line when the piston is moved from the first end position to the second end position;

the actuator comprises an elastic return member able to drive the piston to support the piston against the cam surface;

the elastic return member comprises a spring;

the piston is mounted movable in translation inside the cylinder in a radial direction relative to the axis of rotation of the first element;

the cam surface has a radius which varies angularly with at least one maximum;

the cam surface has a radius which varies angularly, with at least two maxima;

the cam surface has a cross section of elliptical shape;

the actuator comprises a number of pistons p and the cam has a radius which varies angularly with n×p maxima, n being an integer greater than or equal to 1;

the first element comprises a lubricating fluid circulation channel extending inside the first element, the movement of the piston in the cylinder having the effect of causing the lubricating fluid to circulate in the fluid circulation channel;

the actuator comprises a lubricating fluid reservoir arranged inside the body, supply the lubricating fluid circulation channel with lubricating fluid;

the actuator comprises a fluid return passage between the first element and the second element for returning the lubricating fluid to the reservoir.

PRESENTATION OF THE DRAWINGS

Figure 2:
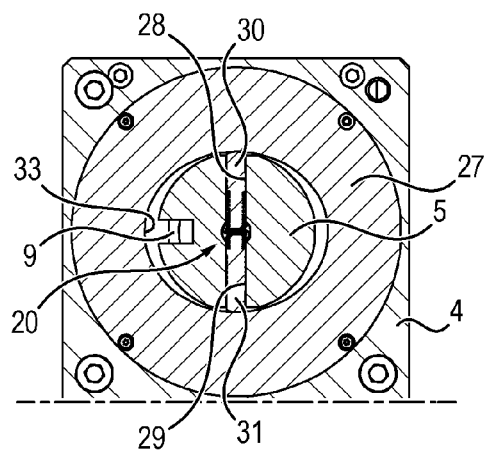
Figure 3:
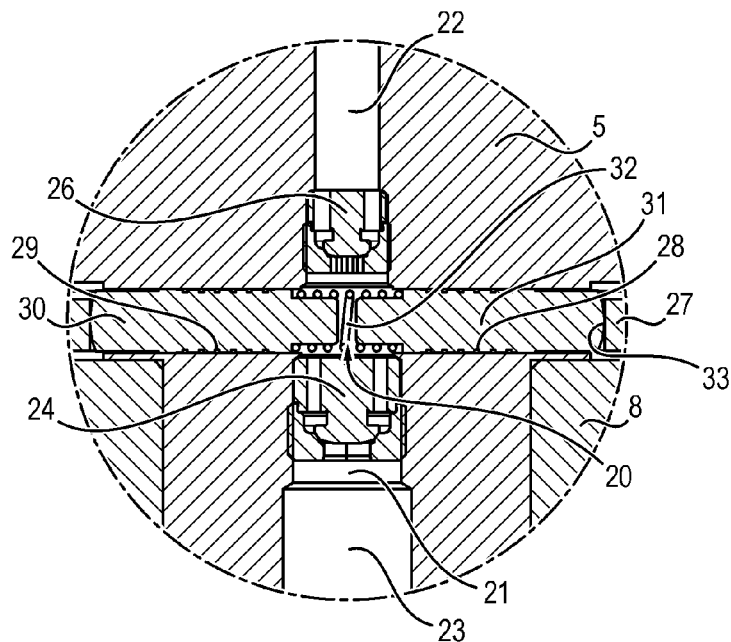
Figure 4:
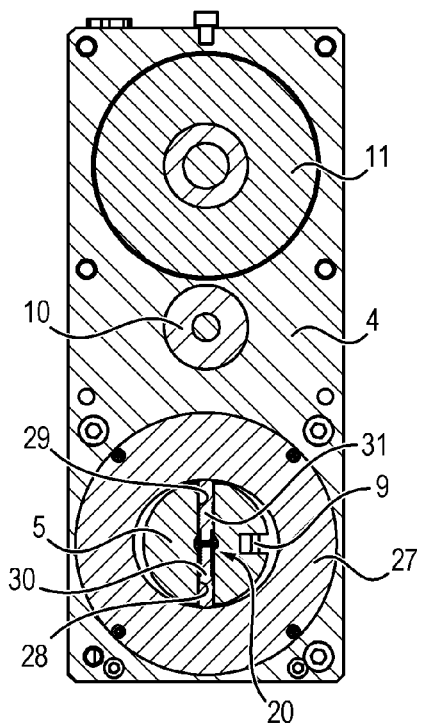
Figure 5:
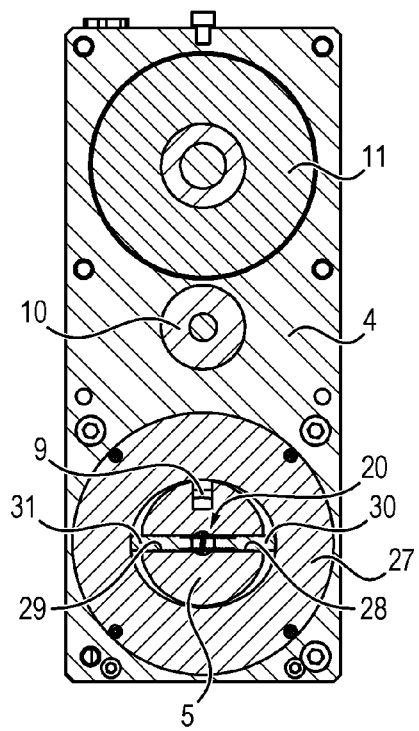
Figure 6:
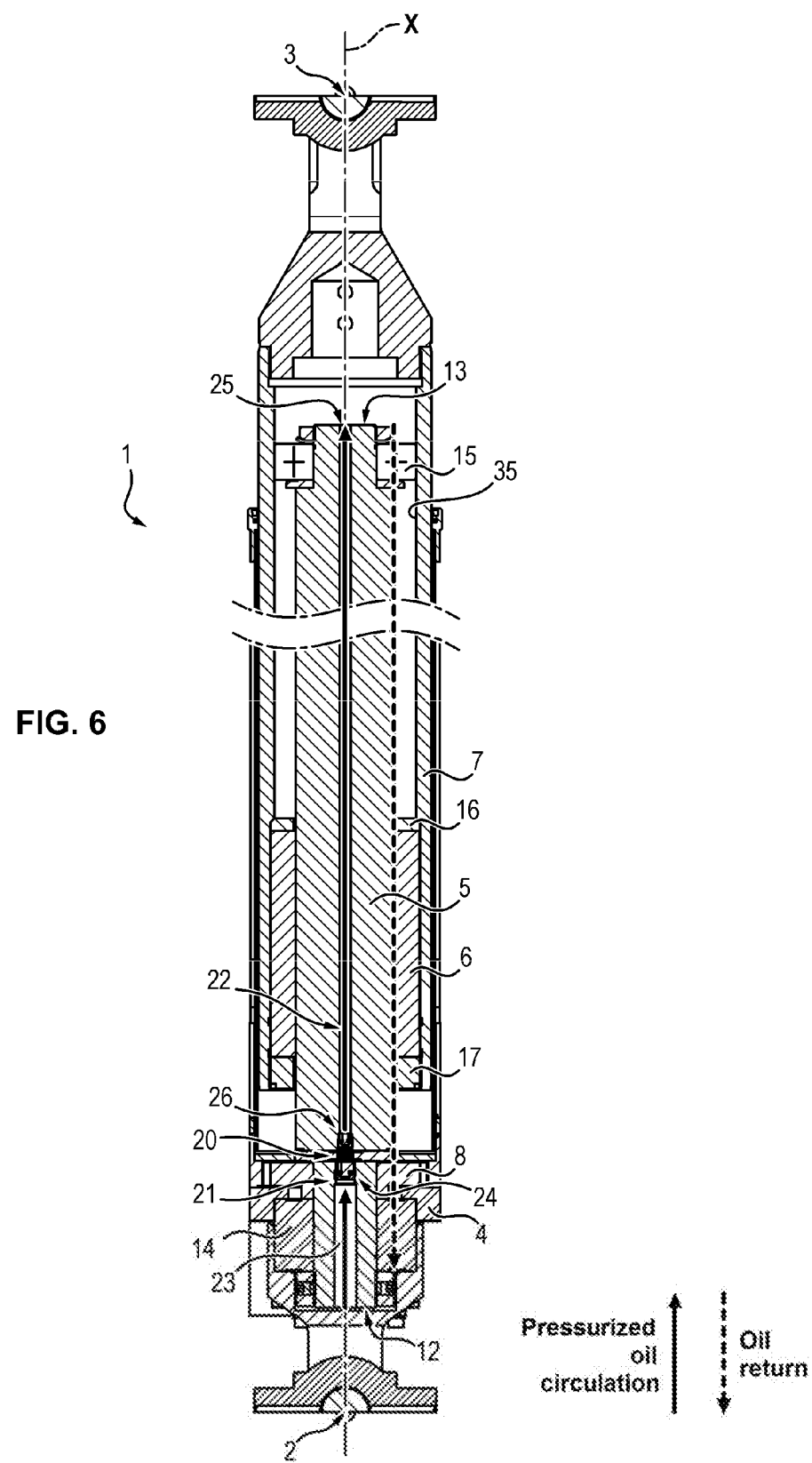

Other features and advantages will be revealed by the description that follows, which is purely illustrative and not limiting, and must be read with reference to the appended drawings, in which:

FIG. 1 shows schematically, in longitudinal section, an actuator conforming to one embodiment of the invention, FIG. 2 shows schematically, in section A-A, the actuator of FIG. 1, FIG. 3 is an enlarged view, in longitudinal section, of the pumping chamber of the actuator, FIGS. 4 and 5 show schematically the actuator in section A-A, when the screw is in a first angular position at 0°, and when the screw is in a second angular position at 90°, respectively, FIG. 6 shows schematically the trajectory of the lubricating fluid inside the actuator.

DETAILED DESCRIPTION OF ONE EMBODIMENT

In FIGS. 1 to 6, the actuator 1 comprises a first end 2 (or lower end) intended for example to be connected to a platform attached to the ground, and a second end 3 (or upper end), intended for example to be connected to a movable platform to which a telecommunication antenna is attached.

The actuator 1 comprises a body 4, a screw 5, a nut 6 and an actuator tube 7.

The screw 5 has a longitudinal axis X. The screw 5 is able to be driven in rotation relative to the body 4 around the axis X. To this end, the actuator 1 comprises a drive pinion 8 fixedly mounted in rotation on the screw 5 by means of a key 9. The drive pinion 8 is able to mesh with an intermediate pinion 10. The drive pinion 8 can thus be driven in rotation by an electric motor 11, via the intermediate pinion 10.

The screw 5 has a first end 12 (or lower end) and a second end 13 (or upper end). The screw 5 is guided in rotation relative to the body 4 by means of a first bearing 14 (or lower bearing) located in proximity to the first end 12 of the screw 5. In the embodiment illustrated in FIGS. 1 to 6, the screw is also guided in rotation relative to the body 4 by means of a second bearing 15 (or upper bearing) located in proximity of the second end 13 of the screw 5. The second bearing 15 is optional; it avoids flutter of the screw 5 when it is driven in rotation at a high speed. The first bearing 14 is mounted between the screw 5 and the body 4. The first bearing 15 is mounted between the screw 5 and the actuator tube 7. The second bearing 15 is mounted sliding relative to the actuator tube 7. More precisely, the second bearing 15 is able to slide on an inner surface 35 of the actuator tube. The first bearing 14 and the second bearing 15 can comprise ball bearings.

The nut 6 surrounds the screw 5. The nut 6 is mounted stationary in the actuator tube 7 by means of an abutment 16 and a fastening nut 17.

The nut 6 is able to cooperate with the screw 5, so that rotation of the screw 5 around the axis X concomitantly causes translation of the nut 6 along the screw 5 parallel to the axis X. To this end, the screw 5 can have a cylindrical external surface 18 in which are arranged helical grooves while the nut 6 can have a cylindrical inner surface 19 in which are arranged helical grooves which are able to cooperate with the helical grooves of the screw 5 to convert a rotation of the of the screw 5 into a translation of the nut 6. The helical grooves of the screw 5 can cooperate with the helical grooves of the nut 6 by means of the balls or the rollers, with or without circulation of the balls or the rollers. The clearances between the external surface 18 of the screw 5 and the inner surface 19 of the screw 6 allow circulation of the lubricating fluid between the screw 5 and the nut 6.

The screw 5 comprises a pumping chamber 20, a suction line 21, a discharge line 22 and a reservoir 23.

The pumping chamber 20 is located inside the screw 5, between the first end 12 of the screw 5 and the second end 13 of the screw 5.

The suction line 21 and the discharge line 22 are formed by a central longitudinal channel 34 extending inside the screw 5, along the axis X. Likewise, the reservoir 23 is formed by a bore provided in the first end 12 of the screw 5.

The reservoir 23 is in communication with the bottom of the body 4 of the actuator, between the lower end 12 of the screw 5 and the body 4.

The suction line 21 connects the reservoir 23 to the pumping chamber 20. The actuator 1 further comprises a first valve 24 (or suction valve) located in the suction line 21. The first valve 24 allows circulation of the fluid in the suction line 21 only in a circulation direction going from the reservoir 23 to the pumping chamber 20.

The discharge line 22 extends from the pumping chamber 20 to the second end 13 of the screw 5. In the embodiment illustrated in FIGS. 1 to 3, the discharge line 22 leads to the outside of the screw 5 by an outlet opening 25 located at the second end 13 of the screw 5. The actuator 1 further comprises a second valve 26 (or discharge valve) located in the discharge line 22. The second valve 26 allows circulation of the fluid in the discharge line 22 in only one circulation direction going from the pumping chamber 20 to the outlet opening 25 of the screw 5.

Moreover, the actuator 1 comprises, in the illustrated embodiment, a cam 27, two cylinders 28, 29, two pistons 30, 31 and an elastic return member 32.

The cam 27 surrounds the screw 5. The cam 27 has the general shape of an annular disk. The cam 27 is mounted stationary on the body 4.

As can be seen in FIG. 2, the cam 27 has a cam surface 33 formed by an inner surface of the cam 27, which surrounds the screw 5. The cam surface 33 has a non-circular transverse section (in a plane orthogonal to the axis X). More precisely, the cam surface 33 has a radius which varies angularly.

In the embodiment illustrated in this figure, the cam surface 33 has an elliptically shaped transverse section, with a major axis and a minor axis, the minor axis being perpendicular to the major axis. In this embodiment, the cam surface 33 thus has a radius which varies angularly with two maxima, located on the major axis of the ellipse, and two minima, located on the minor axis of the ellipse.

Each cylinder 28, 29 is formed by a radial opening arranged in the screw 5. In the embodiment illustrated in FIG. 2, the radial openings are aligned with one another along a diameter of the screw 5.

Each piston 30, 31 is received in a respective cylinder 28, 29. Each piston 30, 31 is mounted movable in translation inside the cylinder 28, 29 in a radial direction relative to the axis X.

The elastic return member 32 is positioned between the two pistons 30 and 31. The elastic return member 32 exerts a return force with drives each piston 30, 31 in a radial direction, toward the surface of the cam 33. In other words, the elastic return member 32 exerts on the pistons 30 and 31 a return force which tends to separate the pistons 30 and 31 from one another, so as to hold each piston 30, 31 in contact with the cam surface 33.

The elastic return member 32 can comprise a spring, such as a coil spring for example.

When the actuator 1 is in operation, the screw 5 is driven in rotation relative to the body 4 around the axis X by the electric motor 11 via the intermediate pinion 10 and the drive pinion 8.

The rotation of the screw 5 relative to the body 4 concomitantly drives a translation movement of the screw 5 relative to the body 4 parallel to the axis X. The nut 5 being integral with the actuator tube 7, the actuator tube 7 is moved in translation relative to the body 4, simultaneously with the nut 5, parallel to the axis X. During the movement in translation of the actuator tube 7, the second bearing 15 (or upper bearing) slides on the inner surface 35 of the actuator tube 7.

The cam 27 being mounted stationary on the body 4, the screw 5 is also driven in rotation relative to the cam 27.

The screw 5 being driven in rotation relative to the cam 27, the pistons 30 and 31 are also driven in rotation relative to the cam 27. As the pistons 30 and 31 are supported against the surface of the cam 33 by the elastic return element 32, the pistons 30 and 31 slide on the cam surface 33. Due to the non-circular shape of the cam surface 33, the pistons 30 and 31 are driven in translation inside the cylinders 28 and 29 in a back-and-forth movement.

As the pistons 30 et 31 are simultaneously driven in opposite movement directions, the back-and-forth movement of the pistons 30 and 31 has the effect of varying the volume of the pumping chamber 20.

In FIG. 4, the screw 5 is in a first angular position at 0°. In this first angular position of the screw 5, the pistons 30 and 31 are located supported against the cam surface 33, at locations where the cam surface 33 has the smallest radius. The pistons 30 and 31 are therefore located simultaneously in a first end position (close position). In this first end position, the pumping chamber 20 delimited by the pistons 30 and 31 has a minimum volume.

In FIG. 5, the screw 5 is in a second angular position at 90°, relative to the first angular position. In this second angular position of the screw 5, the pistons 30 and 31 are located supported against the cam surface 27, at locations where the cam surface 27 has the largest radius. The pistons 30 and 31 are located simultaneously in a second end position (separated position). In this second end position, the pumping chamber 20 delimited by the pistons 30 and 31 has a maximum volume.

Thus, the pistons 30 and 31 are simultaneously moved between the first end position and the second end position so that the volume of the pumping chamber 20 passes in succession from a minimum volume to a maximum volume, then from a maximum volume to a minimum volume.

During a first phase, the movement of the pistons 30 and 31 from the first end position to the second end position has the effect of increasing the volume of the pumping chamber 20 and consequently creating a pressure drop in the pumping chamber 20. The first chamber 24 opens and allows circulation of the lubricating fluid from the reservoir 23 to the pumping chamber 20 via the suction line 21. On the other hand, the second valve 26 closes and prevents circulation of the lubricating fluid from the pumping chamber 20 to the discharge line 22. In this manner, lubricating fluid is extracted from the reservoir 23 and injected into the pumping chamber 20.

During a second phase, the movement of the pistons 30 and 31 from the second end position to the first end position has the effect of reducing the volume of the pumping chamber 20 and consequently creating an overpressure in the pumping chamber 20. The second valve 26 opens and allows circulation of lubricating fluid from the pumping chamber 20 to the discharge line 22. On the other hand, the first valve 24 closes and prevents circulation of lubricating fluid from the chamber 20 to the suction line 21. In this manner, lubricating fluid from the pumping chamber 20 is injected toward the discharge line 22.

As long as the screw 5 is driven in rotation relative to the body 4, the pistons 30 and 31 are given a back-and-forth movement inside the cylinders 28 and 29, which has the effect of circulating the lubricating fluid inside the actuator.

As illustrated in FIG. 6, the lubricating fluid circulates inside the screw 5, via the discharge line 22. The lubricating fluid circulates along the axis X in a direction going from the first end 12 of the screw 5 to the second end 13 of the screw 5.

Once the lubricating fluid has reached the second end 13 of the screw 5, it leaves the screw 5 via the outlet opening 25 and circulates along the outer surface 18 of the screw 5, between the actuator tube 7 and the screw 5. The lubricating fluid circulates along the axis X in a direction going from the second end 13 of the screw 5 to the first end 12 of the screw 5. The lubricating fluid passes through the second bearing 15 and onto the inner surface 35 of the actuator tube 7, then between the screw 5 and the nut 6, then between the cam surface 33 and the screw 5, then between the teeth of the drive pinion 8, then inside the first bearing 14. The lubricating fluid then returns to the reservoir 23. In this manner, the lubricating fluid is recycled.

The circulation flow rate of the lubricating fluid is proportional to the speed of rotation of the screw 5. On the other hand, the direction of circulation of the lubricating fluid is independent of the direction of rotation of the screw 5. The circulation direction of the lubricating fluid is the same regardless of the direction of rotation of the screw 5 relative to the body 4. In this manner, lubrication of the actuator 1 is obtained regardless of the direction of movement of the actuator 1 (i.e. when the actuator deploys and when the actuator retracts).

The proposed actuator 1 allows recycling of the lubricating fluid without the help of an external pump.

Moreover, by selecting pistons 30, 31 and valves 24, 26 that are hermetic or have low losses, priming and circulation of the lubricating fluid can be obtained even in the presence of air in the circuit.

The actuator 1 can further comprise a filling opening positioned in the upper portion of the actuator 1 in order to absorb variations in volume in the pumping chamber 20 or during flushing or during transport and installation phases of the actuator 1.

A reduced diameter in the upper portion (nozzle) allows managing the dead volume in the actuator tube 7. The greater diameter in the lower portion of the discharge line 22 facilitates priming.

Moreover, the actuator 1 can easily be flushed by gravity. To this end, the reservoir 23 is emptied by removing a drain plug situated in the lower portion of the body 4 of the actuator 1. This plug comprises a magnet which recovers any metal particles in the oil. This magnet can be cleaned during maintenance.

The reservoir 23 can be equipped with inlet filters.

In the case of intensive use, the cooling of the screw 5 limits clamping of the screw 5 and the nut 6, and therefore their heating.

A plunger heating system in the pumping chamber 20 can be provided to heat the lubricating fluid and thus limit cold starting friction. The circulation of a heated lubricating fluid improves the efficiency of the actuator 1 at very low temperature.

The deposit of a lubricating fluid film over all the movable or rubbing portions of the actuator 1, limits corrosion in the case of prolonged storage between two periods of operation.

In the embodiment which was just described, the actuator comprises a screw and a nut able to cooperate with the screw by means of balls. However, the invention applies more generally to other actuators of the screw-nut type, for example those in which the nut cooperates with the screw by means of threaded surfaces or by means of rolling element, such as balls or rollers, with or without recirculation of the balls or the rollers.

In the embodiment previously described, the element mounted movable in rotation relative to the body 4 is a screw 5 and the element mounted movable in translation relative to the body 4 is a nut 6. However, the invention also applies to the case where the element mounted movable in rotation relative the body is a nut and the element mounted movable in translation relative to the body is a screw.

The circulation of the lubricating fluid further allows cooling and/or thermal homogenization of the actuator, including in the case of an actuator in which the lubricating fluid is heated (the case for example of actuators installed in an environment where the temperature is low).

In the embodiment described previously, the actuator 1 comprises two pistons 30 and 31 and two cylinders 28 and 29. However, the actuator could comprise any number p of pistons and any number p of cylinders, for example a number p different from 2. In this case, the cam 33 has a radius with varies angularly with n×p maxima, n being an integer greater than or equal to 1.

For example, for p=1 and n=1, the actuator has a single piston, a spring and a cam having a radius which varies angularly with a single minimum and a single maximum (for example a cam surface having a circular shape that is eccentric relative to the axis of rotation X).

The number of elastic elements is matched to the number p of pistons. These elastic elements can be connected to a stationary central part (for example attached to a stationary portion of the discharge valve 26). The elastic elements positioned between two radially aligned pistons can be one-piece, as in the embodiment previously described.

In the case where the actuator comprises a plurality of pistons (p≥1), the pistons are regularly distributed angularly around the axis X.

The actuator can include several pump stages. These pump stages are synchronous (the volumes of the pumping chambers 20 simultaneously reaching their maximum and minimum, thanks to maxima and minima of the radius of the cam surface 33 at the same angles around the axis X), or asynchronously (the volumes of the pumping chambers 20 reaching their minima and maxima at instants offset over time).

The pumping stages can be assembled in series or in parallel. In the case of assembly in parallel, the discharge lines of the different pumping stages lead in parallel into the discharge line 22. The number of valves is adjusted depending on the cases.

The discharge valve can consist of a non-return valve or a pressure loss diaphragm.

In the embodiment described previously, the pistons 30 and 31 are movable in a radial direction relative to the axis X. However, it would be possible to design an actuator in which the pistons would be movable parallel to the axis X. In this case, the pistons would be supported on a cam at the end of the screw 5 and distributed around the reservoir 23 and the cam 27 is made in the casing 4 at the end of 12 of the screw 5.

The invention claimed is:

1. An actuator comprising:
a body,
a first element mounted movable in rotation relative to the body, and a second element mounted movable in translation relative to the body, one of the first element and of the second element being a screw, and the other of the first element and of the second element being a nut, the nut being able to cooperate with the screw so that a rotation of the first element relative to the body around an axis of rotation causes translation of the second element relative to the body parallel to the axis of rotation,
a cylinder which is stationary in relation to the first element,
a piston mounted movable in translation inside the cylinder between a first end position and a second end position,
a cam surface fixed in relation to the body and against which the piston is supported so that rotation of the first element relative to the body causes a back-and-forth movement in translation of the piston between the first end position and the second end position.

2. The actuator according to claim 1, comprising a suction line formed in the first element and able to supply the cylinder with lubricating fluid, and a suction valve able to allow circulation of the lubricating fluid in the suction line toward the cylinder when the piston is moved from the first end position to the second end position, and to prevent circulation of the lubricating fluid in the suction line when the piston is moved from the second end position to the first end position.

3. The actuator according to claim 1, comprising a discharge line formed in the first element and able to discharge the lubricating fluid from the cylinder, and a discharge valve able to allow circulation of the lubricating fluid in the discharge line from the cylinder when the piston is moved from the second end position to the first end position, and to prevent circulation of the lubricating fluid in the discharge line when the piston is moved from the first end position to the second end position.

4. The actuator according to claim 1, comprising an elastic return member able to drive the piston to support the piston against the cam surface.

5. The actuator according to claim 4, wherein the elastic return member comprises a spring.

6. The actuator according to claim 1, wherein the piston is mounted movable in translation inside the cylinder in a radial direction relative to the axis of rotation of the first element.

7. The actuator according to claim 1, wherein the cam surface has a radius which varies angularly, with at least one maximum.

8. The actuator according to claim 7, wherein the cam surface has a radius which varies angularly, with at least two maxima.

9. The actuator according to claim 1, wherein the cam surface has a cross section of elliptical shape.

10. The actuator according to claim 1, comprising a number p of pistons and wherein the cam has a radius which varies angularly with n x p maxima, n being an integer greater than or equal to 1.

11. The actuator according to claim 1, wherein the first element comprises a lubricating fluid circulation channel-extending inside the first element, the movement of the piston in the cylinder having the effect of causing the lubricating fluid to circulate in the fluid circulation channel.

12. The actuator according to claim 9, comprising a lubricating fluid reservoir arranged inside the body to supply the lubricating fluid circulation channel (34) with lubricating fluid.

13. The actuator according to claim 12, comprising a fluid return passage between the first element and the second element for returning the lubricating fluid to the reservoir.

* * * * *

UNITED STATES PATENT AND TRADEMARK OFFICE
CERTIFICATE OF CORRECTION

PATENT NO. : 11,073,202 B2
APPLICATION NO. : 17/046557
DATED : July 27, 2021
INVENTOR(S) : Hervé Houdard and Thomas Mégard Page 1 of 1

It is certified that error appears in the above-identified patent and that said Letters Patent is hereby corrected as shown below:

In the Claims

Column 10, Line 17; In Claim 12, delete "(34)" therefor

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*